(12) United States Patent
Green et al.

(10) Patent No.: US 11,966,076 B2
(45) Date of Patent: Apr. 23, 2024

(54) HIGH-TEMPERATURE OPTICAL FIBER TRANSDUCER AND METHOD OF PRODUCING SAME

(71) Applicants: National Research Council of Canada, Ottawa (CA); FIBOS Inc., Toronto (CA)

(72) Inventors: Richard Green, Ottawa (CA); Lixue Wu, Ottawa (CA); Michael Bakaic, Toronto (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 17/909,061

(22) PCT Filed: Feb. 19, 2021

(86) PCT No.: PCT/CA2021/050185
§ 371 (c)(1),
(2) Date: Sep. 2, 2022

(87) PCT Pub. No.: WO2021/174336
PCT Pub. Date: Sep. 10, 2021

(65) Prior Publication Data
US 2023/0088327 A1 Mar. 23, 2023

Related U.S. Application Data

(60) Provisional application No. 62/983,987, filed on Mar. 2, 2020.

(51) Int. Cl.
*G02B 6/02* (2006.01)
*G01P 15/093* (2006.01)

(52) U.S. Cl.
CPC ........ *G02B 6/02176* (2013.01); *G01P 15/093* (2013.01)

(58) Field of Classification Search
CPC .................... G02B 6/02176; G02P 15/093
See application file for complete search history.

(56) References Cited

U.S. PATENT DOCUMENTS

| 6,175,108 B1 | 1/2001 | Jones et al. |
| 6,955,085 B2 | 10/2005 | Jones et al. |

(Continued)

FOREIGN PATENT DOCUMENTS

| CN | 102809778 | 8/2012 |
| CN | 104596434 | 10/2013 |

(Continued)

*Primary Examiner* — Sung H Pak
(74) *Attorney, Agent, or Firm* — Kyle R Satterthwaite; Ryan W Dupuis; Ade & Company Inc.

(57) ABSTRACT

An optical fiber transducer usable in environments of extreme operating temperature features a stationary support, a movable body displaceable back and forth relative thereto, and an optical fiber connected between the support and the movable body. The fiber has a Fiber Bragg Grating in an intermediate region thereof between the support and movable body. To accommodate varying coefficients of thermal expansion (CTEs) among these components, one or more tubes close circumferentially around the fiber. Each tube has a CTE that is greater than that of the fiber, and less than that of the constituent material of the support and movable body. The fiber is bonded to an interior of the tube(s), while an exterior of the tube(s) is bonded to the support and movable body.

21 Claims, 4 Drawing Sheets

(56) References Cited

U.S. PATENT DOCUMENTS

| | | |
|---|---|---|
| 7,137,299 B2 | 11/2006 | Meyer |
| 8,280,202 B2 | 10/2012 | Xia et al. |
| 8,726,732 B2 | 5/2014 | Littler et al. |
| 9,798,078 B2 | 10/2017 | Tsai et al. |
| 2006/0285813 A1 | 6/2006 | Ferguson |
| 2006/0146909 A1 | 7/2006 | Morse |
| 2013/0131197 A1 | 9/2013 | Masek et al. |
| 2019/0079111 A1* | 3/2019 | Hung ............... G01L 1/246 |

FOREIGN PATENT DOCUMENTS

| | | |
|---|---|---|
| CN | 203606024 | 12/2013 |
| KR | 20050059875 | 6/2005 |

* cited by examiner

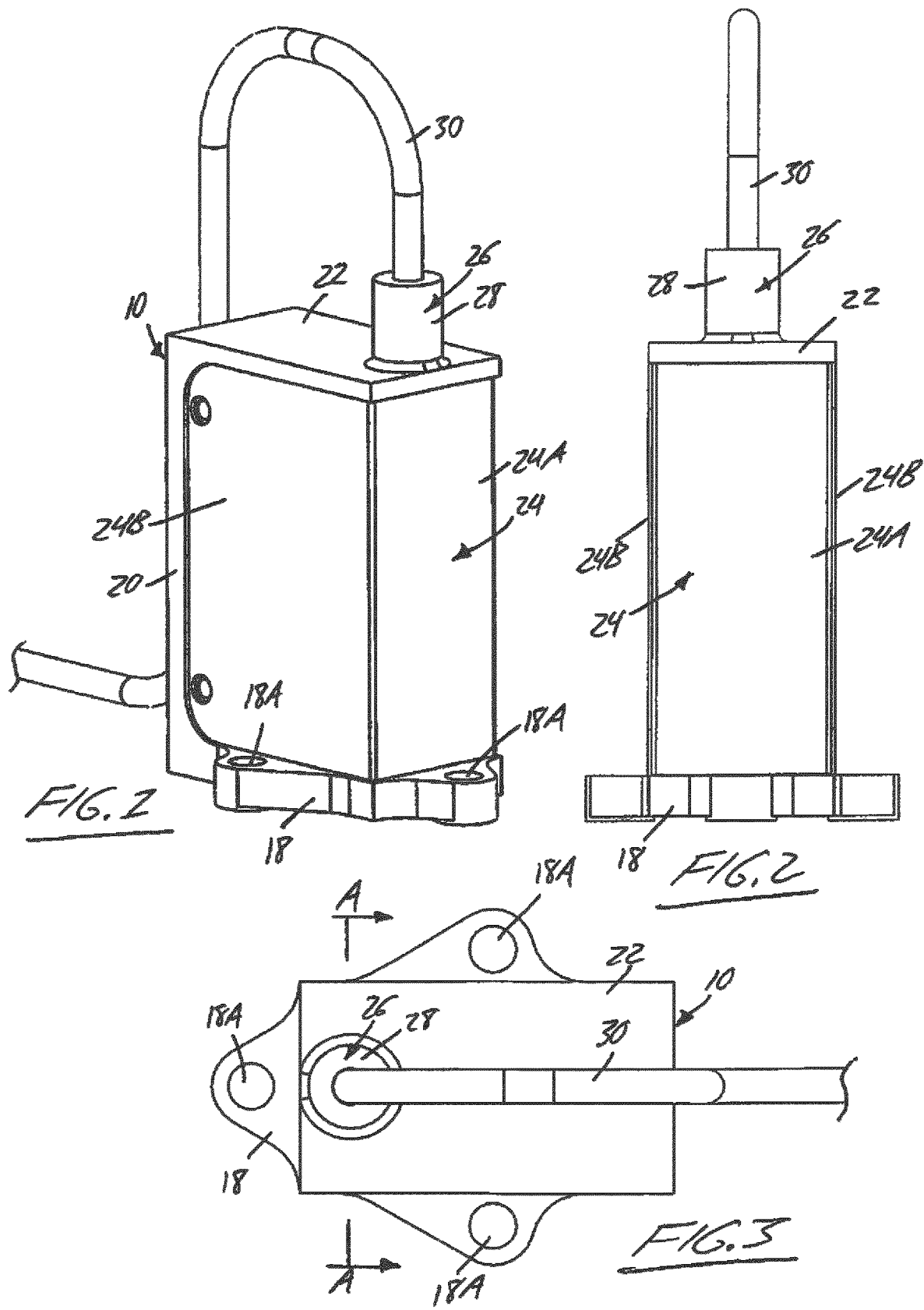

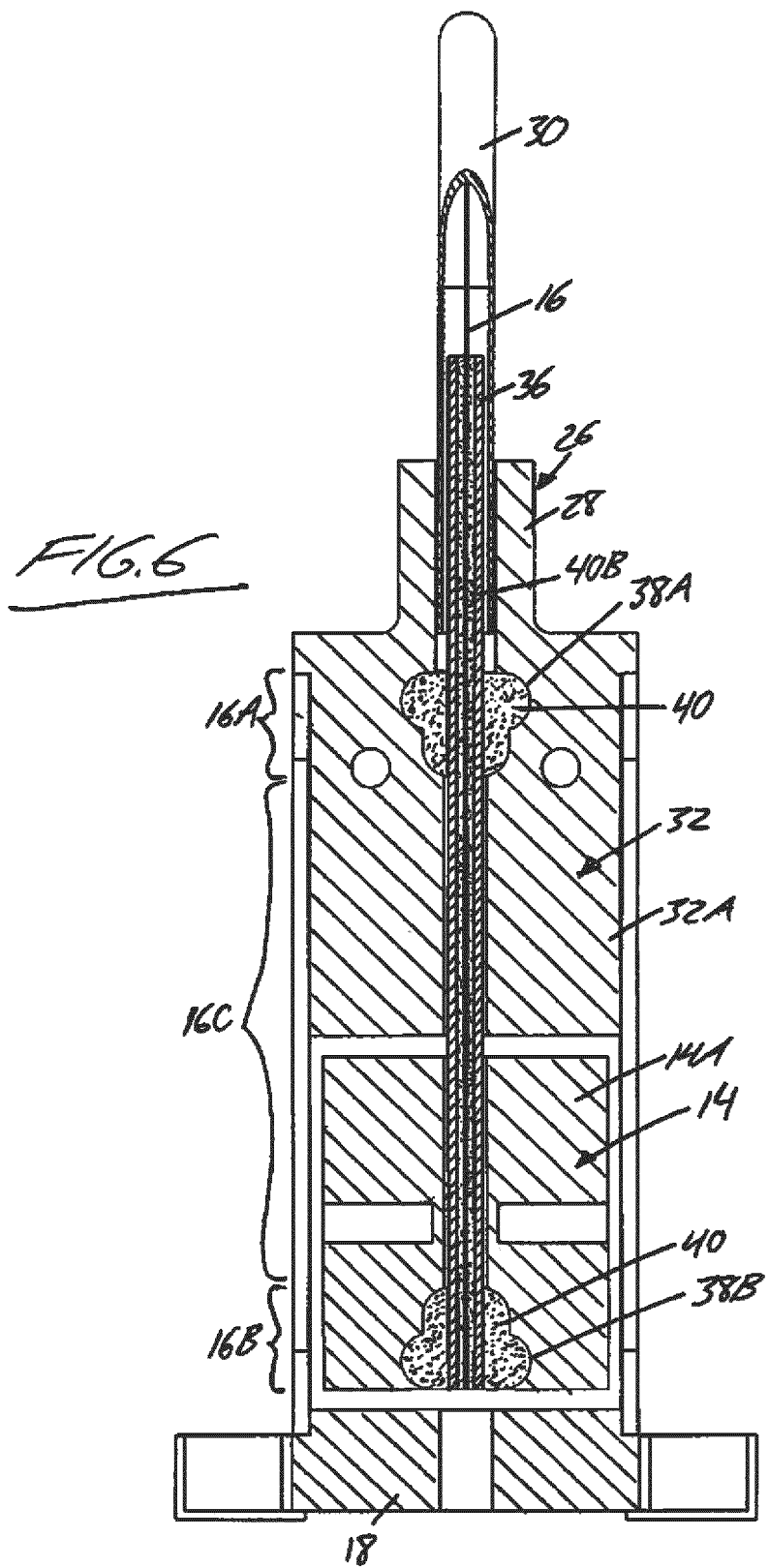

HIGH-TEMPERATURE OPTICAL FIBER TRANSDUCER AND METHOD OF PRODUCING SAME

FIELD OF THE INVENTION

The present invention relates generally to accelerometers and other transducers, and more specifically to design of optical fiber based transducers suited for use in extreme temperature environments.

BACKGROUND

Conventional accelerometers are not capable of operating in harsh environments. It has been proposed previously to employ optical fiber based transducers in harsh environments, where an optical fiber with a Fiber Bragg Grating (FBG) replaces conventional sensing elements.

U.S. Pat. No. 6,955,085 discloses one example in the context of an accelerometer, in which a housing made of Inconel nickel-chromium superalloy is employed to withstand harsh downhole conditions in oil and gas applications, while a rhomboidal flexure for holding a quartz FBG element is made of Invar metal alloy or stainless steel, selected particularly for its low coefficient of thermal expansion (CTE). While the Inconel housing can withstand harsh downhole conditions, the internal flexure may be problematic at particularly extreme temperatures.

U.S. Pat. No. 8,280,202 discloses a sensing module for measuring dynamic parameters in a combustion chamber. The module features pre-strained and strain-free FBG sensors mounted on a cantilevered beam, optionally made of nickel-chromium superalloy. In select embodiments, the silicon dioxide fibers are secured to the cantilevered beam with a metal-ceramic adhesive to withstand high temperatures in a combustion chamber environment, and the adhesive is particularly selected to have similar CTE to the constituent material of the beam.

Despite such previous proposals concerning use of high temperature nickel-chromium superalloy in fiber-based transducer design, there remain further challenges, such as the need to address differential expansion between the optical fiber and the high-temperature materials to which the fiber is connected. Accordingly, there remains need for further advancement in the field of high temperature fiber-based transducers.

SUMMARY OF THE INVENTION

According to one aspect of the invention, there is provided an optical fiber transducer comprising:
a stationary support;
a movable body supported in a manner displaceable back and forth relative to the stationary support in a predetermined direction;
an optical fiber having a portion thereof operatively connected between the stationary support and the movable body in a position extending axially in said predetermined direction, said portion of the optical fiber having a first coupling region at which said portion is operably connected to the stationary support, a second coupling region at which said portion is operably connected to the movable body and an intermediate region disposed between said first and second coupling regions;
a Fiber Bragg Grating in the intermediate region of said portion of the optical fiber; and
one or more tubular members disposed externally around said portion of the optical fiber, at least at the first and second coupling regions thereof, said one or more tubular members each comprising a material having a thermal expansion coefficient that is lesser than that of said stationary support and said movable body, and greater than that of the optical fiber;
wherein:
at the first coupling region, said portion of the optical fiber is bonded to a first internal surface area of said one or more tubular members, and a first external surface area of said one or more tubular members is bonded the stationary support; and
at the second coupling region, said portion of the optical fiber is bonded to a second internal surface area of said one or more tubular members, and a second external surface area of said one or more tubular members is bonded the stationary support.

According to a second aspect of the invention, there is provided a method of producing an optical fiber transducer usable in environments of extreme operating temperature, components of said transducer including a stationary support, a movable body intended for back and forth displacement relative to the stationary support in a predetermined direction, and an optical fiber intended for connection to said stationary support and said movable body in a position spanning axially therebetween in said predetermined direction, and having a Fiber Bragg Grating in an intermediate region of said fiber, said method comprising configuring the transducer to accommodate varying coefficients of thermal expansion among said components by:
providing one or more tubular members each having a thermal expansion coefficient that is lesser than that of said stationary support and said movable body, and greater than that of the optical fiber;
at first and second coupling regions that reside oppositely of one another across the intermediate region of the fiber that contains the Fiber Bragg Grating, bonding said optical fiber to an interior of said one or more tubular members; and
bonding an exterior of said one or more tubular members to said stationary support and said movable body.

BRIEF DESCRIPTION OF THE DRAWINGS

Preferred embodiments of the present invention will now be described in conjunction with the accompanying drawings in which:

FIG. 1 is a front side perspective view of a novel high-temperature optical fiber transducer according one embodiment of the present invention.

FIG. 2 is a front elevational view of the transducer of FIG. 1.

FIG. 5 is a cross-sectional view of the transducer of FIG. 3 as viewed along line A-A thereof.

FIG. 6 is a cross-sectional view of the transducer of FIG. 4 as viewed along line B-B thereof.

DETAILED DESCRIPTION

Figure 3:
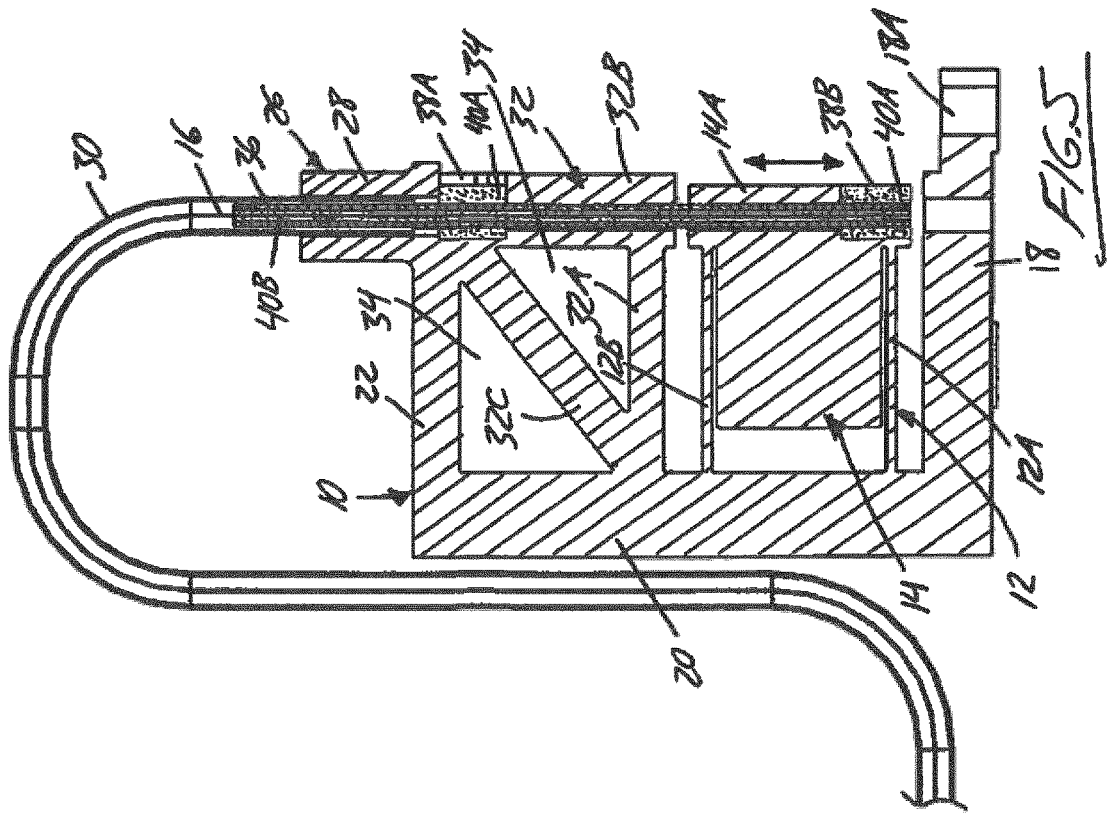
FIG. 3 is a top plan view of the transducer of FIG. 1.

FIGS. 1 through 6 show an optical fiber transducer designed to withstand extreme temperatures, such as those experienced in aerospace engine testing and monitoring, power generation turbines, and drilling operations, though use of the transducer is in no way limited to any one or more of these particular examples. In the illustrated example, the transducer is an accelerometer featuring a fixture 10 for mounting to a subject structure or object (hereafter "the subject") whose acceleration is to be measured, and for supporting other componentry of the transducer; a flexure 12 movably coupling a proof mass 14 to the fixture so as to undergo oscillatory movement relative thereto about an equilibrium position during vibration of the subject; and an optical fiber 16, for example a silicon-dioxide optical fiber, that has a Fiber Bragg Grating (FBG) and has a portion of the fiber 16 coupled between the fixture 10 and the flexure 12. In a known manner, an optical interrogator (not shown) operating on the fiber can use detected spectral changes in the reflected incident light from the FBG, resulting from the time-varying axial strain in the fiber due to the oscillatory movement of the proof mass to which the fiber is coupled, to derive the acceleration of the subject.

The fixture 10 in the illustrated example features a base 18 configured with a set of mounting holes 18A by which the base is fastenable to the subject, an upright wall 20 integrally affixed to the base 18 to stand upright therefrom at one end thereof, an overhanging top wall 22 integrally affixed to the upright wall 20 at the top end thereof and spanning outward to the same side thereof as the base 18 in elevationally spaced and parallel relation thereto, whereby the base 18, upright wall 20 and overhanging top wall 22 thus collectively define a generally C-shaped outer structure of the fixture 10. In FIGS. 1 and 2, a removable three-sided outer cover 24 is mated with the fixture 10 in a position closing around the space delimited between the base 18 and the overhanging top wall 22. The cover 24 features a front wall 24A standing in opposing and parallel relation to the upright wall 20 of the fixture, and two side walls 24B spanning perpendicularly from the front wall 24A the opposing upright wall 20 of the fixture at opposing sides thereof. A fiber admission port 26 features a cylindrical female receiver 28 standing perpendicularly upright from the overhanging top wall 22 near a distal end thereof furthest from the upright wall 20 of the fixture. A fiber-protecting tubular sheath 30 has one end thereof received axially and concentrically within this female receiver 28 from a top end thereof.

Figure 4:
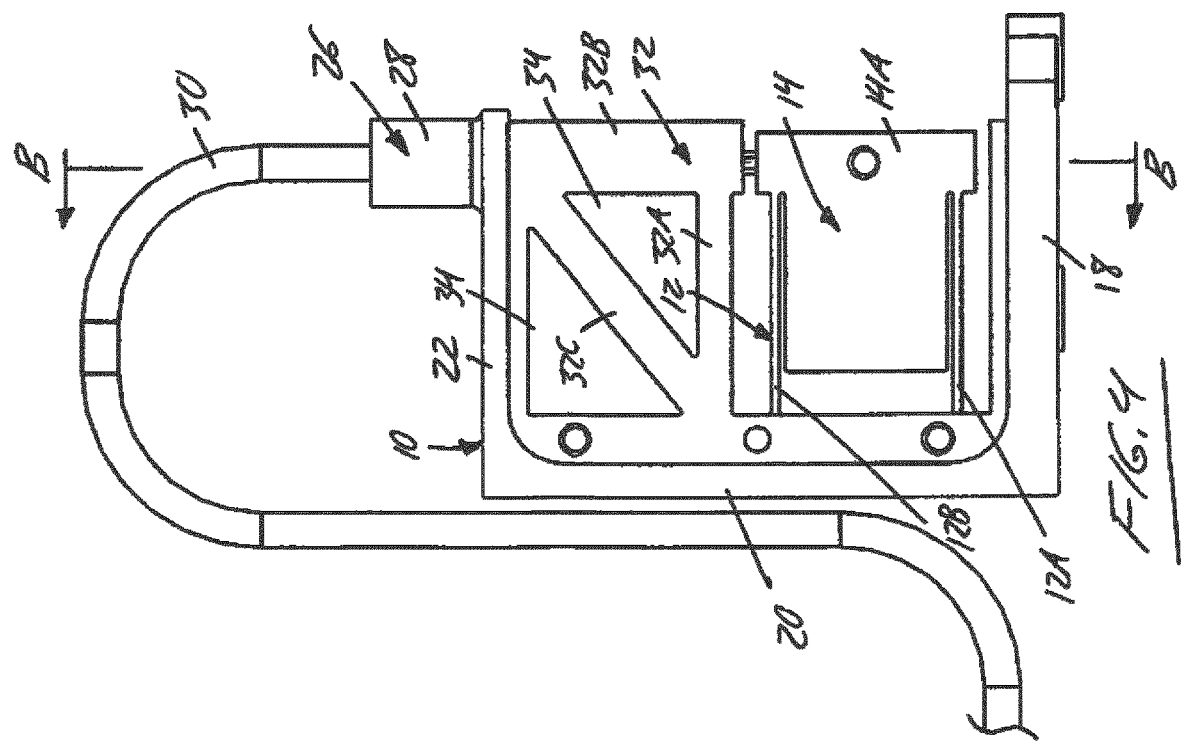
FIG. 4 is a side elevational view of the transducer of FIG. 1 with an outer cover thereof removed.

FIG. 4 shows the transducer with the outer cover 24 thereof removed to illustrate the internal components of the transducer normally concealed behind the cover 24. The fixture 10 features a stationary support 32 integrally affixed to both the underside of the overhanging top wall 22, and a front side of the upright wall 20. Though this stationary support 32 may alternatively be a continuously solid block, in the illustrated example it instead has two triangular void spaces 34 spanning transversely therethrough from one side of the fixture 10 to the other. Left intact around these voids are a bottom segment 32A of the stationary support 32 spanning forwardly from the upright wall 20 of the fixture 10 in parallel overlying relation to the base 18 at a spaced elevational distance therefrom, an upright front segment 32B lying in parallel spaced relationship from the upright wall 20 of the fixture and spanning downwardly from the distal end of the top wall 22 of the fixture 10 in aligned relation beneath the fiber admission port 26, and a diagonal bracing segment 32C spanning from the juncture between the upright wall 20 and bottom segment 32A to the juncture between the overhanging top wall 22 and the front segment 32B. The thicknesses of the three segments 32A, 32B, 32C of the partially hollowed-out support 32 and those of the upright wall 20 and top wall 22 to which they are integrally affixed impart sufficient strength and structural rigidity to the fixture so that the stationary support 32 is held rigidly stationary relative to the base 18, and thus will not move relative to the vibrating subject to which the base 18 is mounted.

The flexure 12 and the proof mass 14 supported thereby are carried on the fixture 10 in the space between the stationary support 32 and the base 18, but in movable rather than rigidly fixed relationship thereto. In the illustrated example, the flexure 12 is of a dual-cantilever design comprising two cantilever beams 12A, 12B residing respectively adjacent the base 18 and the bottom segment 32A of the overlying stationary support 32. Proximal ends of the two cantilever beams 12A, 12B are attached to the upright wall 20 of the fixture, while opposing distal ends of the two cantilever beams 12A, 12B are attached to the proof mass 14. In the illustrated example, each cantilever beam 12A, 12B is integrally attached to the upright wall 20 of the fixture, and also integrally attached to the proof mass 14, particularly at a location nearer to a front side thereof furthest from the upright wall 20 than to a rear side thereof that is nearest to, and faces toward, the upright wall 20 from which the cantilever beams 12A, 12B originate. A front segment 14A of the proof mass 14 resides in aligned relation beneath the front segment 32B of the stationary support 32.

The front segment 32B of the stationary support 32 is vertically penetrated by a first through-bore running fully therethrough from the top end of the fiber admission port 26, to the bottom end of the stationary support's front segment 32B. Likewise, the front segment 14A of the proof mass 14 is vertically penetrated by a second through-bore running fully therethrough from the top end of the proof mass 14 nearest to the stationary support 32, to the opposing bottom end of the proof mass nearest to the base 18, specifically in a position aligned with the first through-bore in the stationary support 32. It is through these two aligned bores that the optical fiber 16 is routed through the protective tubular sheath 30 into the stationary support 32 via the fiber admission port 26, and onward from the stationary support 32 into the proof mass 14. As a result, the portion of the optical fiber spanning the stationary support 32 and the proof mass 14 has its axis lying in the predetermined direction in which stationary support 32 and the proof mass 14 are spaced apart from one another, and in which the proof mass 14 is movable back and forth relative to the stationary support under bending of the cantilever beams 12A, 12B.

The cantilever beams 12A, 12B, which in the illustrated example are seamlessly integral components on the same single unitary body that also defines the fixture 10, support body 32 and proof mass 14, and are therefore made of the same constituent material thereof, are specifically dimensioned to be thinner than the comparatively thick segments 32A, 32B, 32C of the support body 32 in the predetermined direction in which the flexure 12 and proof mass 14 are spaced from the stationary body 32 (i.e. in the vertical direction in the case of the illustrated transducer design and orientation, though this need not be the case in other designs or working orientations of the transducer). The reduced thickness of the cantilever beams is particularly selected to enable oscillatory movement of the beams 12A, 12B and attached proof mass 14 back and forth in this the predetermined direction relative to the base and stationary support 32. Meanwhile, the cantilever beams 12A, 12B substantially constrain the movement of the proof mass 14 to this singular degree of freedom, i.e. in this predetermined direction corresponding to bending flexure of the cantilever beams 12A, 12B about axes lying perpendicularly cross-wise to the beams and the predetermined direction, thereby preventing movement of the proof mass about other axes.

For the purpose of withstanding extreme temperatures, the constituent material of the singular unitary body that integrally defines the fixture 10, stationary support body 21, flexure 12 and proof mass 14 is preferably selected from among: nickel alloys, for example Inconel nickel-chromium superalloy; ceramics; oxides; and other high-temperature materials. To reduce potential detriment to measurement accuracy due to the thermal expansion, the illustrated embodiments employ a particularly novel solution for coupling the optical fiber 16 to the stationary support 32 and the movable proof mass 14. Rather than bonding the fiber 16 directly to the constituent materials of the stationary support 32 and proof mass 14, which may have a notably different CTE than the fiber 16 itself, one or more tubular members 36, each made of a high-temperature compatible material (e.g. quartz) having an intermediate CTE between that of the fiber material and the constituent material of the support 32 and proof mass 14, are installed in positions surrounding the optical fiber 16 inside the through-bores of the support 32 and proof mass 14. These one or more tubular members 36 serve as a bonding interface across which indirect coupling is achieved between the optical fiber 16 and each of the stationary support 32 and proof mass 14.

In the illustrated example, a singular tubular member 36, for example a quartz tube, is employed for this purpose, and thus occupies both the first through-bore in the stationary support 32 and the second through-bore in the proof mass 14. As shown, this tubular member 36 may fully span the entire length of one or both of these bores, and optionally extend fully through the stationary support 32, and onward into or through the fiber admission port 26, and thus into the fiber-protective sheath 30 received therein.

In the illustrated example, the first through-bore in the stationary support 32 is adjoined by a first hollow adhesion cavity 38A that opens into the front segment 32B of the stationary support 32 from the front side thereof at or near the top of the stationary support 32, whereby this cavity 38A resides closely adjacent to the overlying fiber admission port 26. Here, the first through-bore and adjoining first adhesion cavity 38A are filled with a high temperature adhesive 40A that bonds a first outer surface area of the tubular member 36 to the surrounding constituent material of the support body 32. The tubular member 36 is therefore bonded to the stationary support 32 at a location thereon lying furthest from the proof mass 14 in the predetermined direction in which the proof mass is movable back and forth relative to the stationary support 32. Likewise, the second through-bore in the proof mass 14 is adjoined by a second hollow adhesion cavity 38B that opens into the front segment 14A of the proof mass 14 at the front side thereof at or near the bottom of the proof mass 14, and thus closely adjacent to the underlying fixture base 18. Here, the second through-bore and adjoining second adhesion cavity 38B are filled with the same high temperature adhesive 40A in order to bond a second outer surface area of the tubular member 36 to the surrounding constituent material of the proof mass 14. The tubular member 36 is therefore bonded to the proof mass 14 at a location thereon lying furthest from the stationary support 32 in the predetermined direction in which the proof mass is movable back and forth relative to the stationary support 32. Though the illustrated configuration maximizes the distance between the two areas at which the tubular member is bonded to the fixture and proof mass in the interest of minimizing the overall size of the transducer relative to the FBG length in the axial direction, this need not necessarily be the case in other embodiments.

At least at the areas of the tubular member 36 that are externally bonded to the constituent material of the stationary support 32 and proof mass 14, the tubular member 36 is also internally bonded to the optical fiber 16 by another high temperature adhesive 40B occupying the annular space between the outer circumference of the fiber 16 and the inner wall surface of the tubular member. In the illustrated example, the optical fiber 16 is bonded to the interior of the tubular member 36 by this adhesive 40B not only at these externally bonded areas of the tubular member 36, but also over an entire intermediate area of the tubular member spanning between these two externally bonded areas. In the illustrated example where the tubular member 36 also extends upwardly beyond the first adhesion cavity 38A, optionally over the full length of the tubular member 36, thus optionally reaching into the fiber admission port 26 and/or protective sheath 30, the fiber may also be bonded to the tubular member at this additional area beyond the tubular member's external bond to the stationary body 32. This maximizes the bonding surface area between the fiber 16 and the surrounding tubular member 36 for optimal bond strength therebetween.

The high-temperatures adhesives used for bonding of the tubular member 36 to the stationary support 32, proof mass 14 and fiber 16 may include one or more refractory cements, for example including one or more of $Al_2O_3$ alumina based cement, $SiO_2$ silica based cement, MgO magnesium oxide based cement, and $MgO—P_2O_5$ zirconium oxide based cement. In one non-limiting example, a quartz tube and $SiO_2$ optical fiber are employed, with a compatible $SiO_2$ silica based cement accordingly being used there between.

The region of the optical fiber 16 situated inside the tubular member 36 at the first adhesion cavity 38A thus denotes a first coupling region 16A at which the fiber is indirectly coupled to the stationary support 32 by the fiber's adhered bond to a first internal surface area of the tubular member 36 and the stationary support's adhered bond to a first external surface area of the tubular member 36. Likewise, the region of the optical fiber 16 situated inside the tubular member 36 at the second adhesion cavity 38B thus denotes a second coupling region 16B at which the fiber 16 is indirectly coupled to the movable proof mass 14 by the fiber's adhered bond to a second internal surface area of the tubular member 36 and the proof mass' adhered bond to a second external surface area of the tubular member 36. The Fiber Bragg Grating of the optical fiber 16 is situated somewhere in an intermediate region 16C of the optical fiber that spans between the first and second coupling regions 16A, 16B, whereby the FBG properly resides at a location that will experience strain variation during oscillatory motion of the movable proof mass 14.

Using the tubular member 36 as an intermediary bonding interface between the optical fiber 16 and the Inconel or other high-temperature constituent material of the stationary support 32 and proof mass 14 improves the resilience of the transducer to CTE mismatch between the fiber 16 and this constituent material. By comparison, if the fiber 16 was directly cemented to the constituent material, the small available bonding area of the fiber may be incapable of withstanding the effects of differential thermal expansion between the fiber 16 and surrounding constituent material of the stationary support 32 and movable proof mass 14. In the example of FIGS. 1 through 6 where the same singular tube is bonded both to the stationary support 32 and the movable proof mass 14, and the tube material is stiffer than the flexure material (such as in the case of a quartz tube and Inconel flexure), the spring behaviour of the transducer is dominated by the material properties of the tubular member 36 rather than those of the cantilever beams 12A, 12B of the flexure 12. However, this need not necessarily be the case in other embodiments, where the flexure may dominate the spring behaviour depending on the relative characteristics of the tube and flexure materials. The continuous span of the tubular member between the coupling regions thus contributes a greater spring stiffness, reducing the sensitivity of the transducer, but affords operation over a broader temperature range, and prevents folding of the fiber back on itself during movement of the flexure and proof mass.

Figure 7:
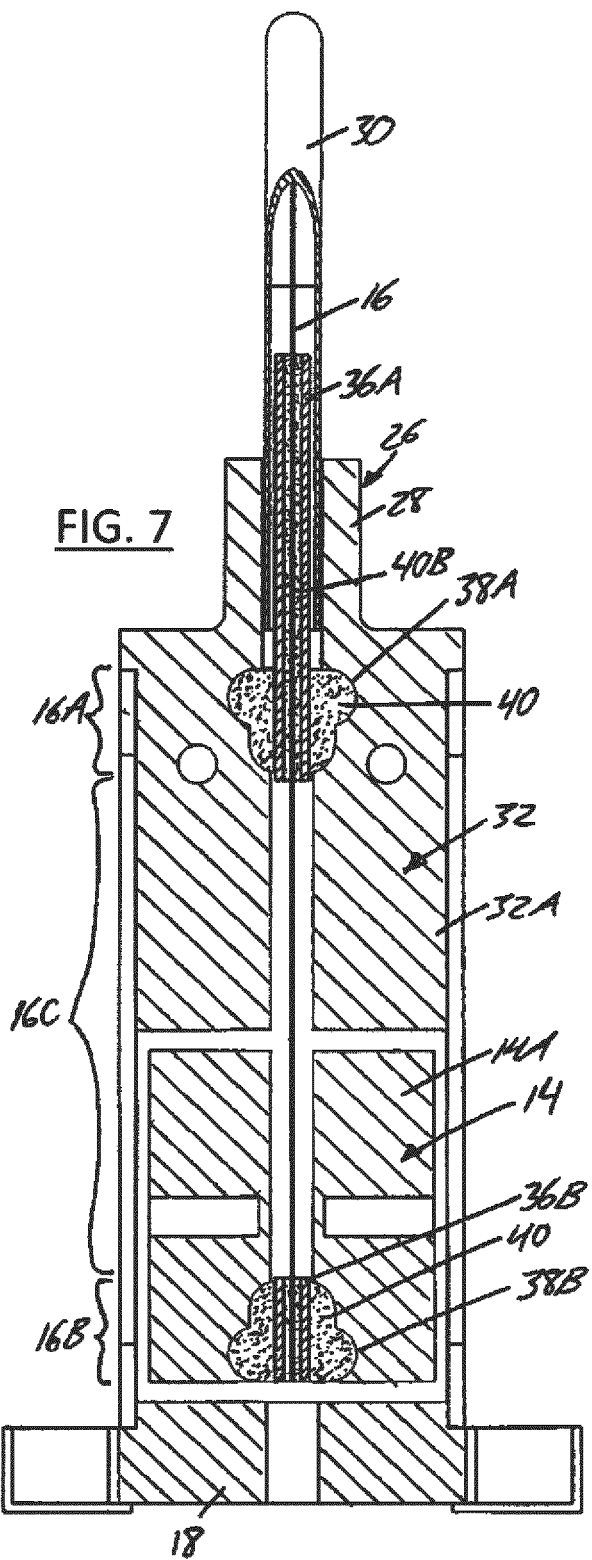
FIG. 7 is a cross-sectional view, in the same plane as FIG. 6, but of an alternate embodiment.

In another embodiment shown in FIG. 7, rather than having a continuous span of the tubular member from the first coupling region 16A at the stationary support 32 to the second coupling region 16B at the proof mass 14, separate tubular members 36A, 36B may instead be employed at the two coupling regions 16A, 16B, each thus being bonded to only a respective one of either the stationary support 32 or the proof mass 14. The fiber 16 is thus be separately bonded to the interior surfaces of these two different tubular members at the stationary support 32 and the proof mass 14, and at least part of the intermediate region 16C of the fiber is left unsheathed and unbonded between these two separate tubular members. In this embodiment, the spring behaviour of the transducer is dictated solely by the material properties of the fiber and the cantilever beams 12A, 12B of the flexure 12, of which the flexure characteristics would be expected to dominate, as neither tube 36A, 36B is attached to both the stationary support 32 and the proof mass 14. This embodiment is more sensitive than the earlier single-tube embodiment, since no spring stiffness is contributed by the separate tubular members 36A, 36B respectively bonded to only one of either the stationary support 32 or the proof mass 14. In this separately-bonded embodiment employing separate tubes 36A, 36B independently bonded to the stationary support 32 and the proof mass 14, the fiber 16 is pre-strained in tensile fashion to overcome the expected thermal expansion of the fiber 16 at the anticipated operating temperatures of the transducer, and to account for the change in index of refraction of the fiber with temperature. The appropriate amount of pre-strain required can be calculated using known theory.

So during assembly of the shared-bonding embodiment shown in FIGS. 1 through 6, where the same tubular member 36 is bonded to both the stationary support 32 and the proof mass 14, the fiber can be bonded to the tubular member in a relaxed unstrained state, and the tubular member then bonded to the stationary support 32 and the proof mass 14 while the proof mass is in its equilibrium position. However, during assembly of the separately bonded embodiment of FIG. 7, the fiber is bonded to the separate tubular members 36A, 36B in a relaxed state, and one of the separate tubular members 36A is then bonded to the stationary support 32, followed by bonding of the other separate tubular member 36B to the proof mass 14 while the proof mass is held in a displaced state moved from its equilibrium position in a direction away from the stationary support 32, i.e. with the flexure held in a deflected state angling away from the stationary support 32, thereby pre-loading the fiber to leave a tensile pre-strain therein once the adhesive has set.

Also, while the illustrated embodiments employ a single-stage bonding interface, where there's only one tubular member surrounding the fiber 16 at each coupling region 16A, 16B, another embodiment may employ a multi-stage bonding interface where more than one tubular member surrounds the fiber 16 at each coupling region 16A, 16B. Such multi-tube configuration would employ multiple tubes of different material properties from one another to incrementally bridge the gap between the different CTEs of the fiber and the constituent material of the stationary support 32 and proof mass 14.

For example, a dual-stage bonding interface would feature an inner tubular member having an internal surface area bonded to the fiber, and an outer tubular member that surrounds the inner tubular member, with an internal surface area of the outer tubular member being bonded to an external surface area of the inner tube, and an outer surface area of the outer tubular member being bonded to the constituent material of the stationary support 32 or proof mass 14. Both tubular members would have a CTE lesser than that of the constituent material of the stationary support 32 and proof mass 14, but greater than that of the optical fiber 16, while the CTE of the inner tubular member would be less than that of the outer tubular member. Similarly, more than two tubes could be employed for even more gradual bridging of the CTE gap. In any such multi-stage implementation, the tubular members may be full-length shared-bond tubular members spanning both coupling regions 16A, 16B, and thus contributing to the spring characteristics of the transducer like the full-length shared-bond single tube example shown in the drawings, or separate tubular members may be used at the stationary support and the movable proof mass in a separate-bond implementation where the fiber 16 is once again pre-strained according to a desired operating temperature range of the transducer.

It will also be appreciated that while the illustrated transducer is an accelerometer whose cantilever-supported proof mass 14 serves as a movable body whose movement relative to a stationary support cause strain variation in the optical fiber 16, this is a non-limiting example, of which there are others within the scope of the present invention. For example, the movable body to which an optical fiber is similarly indirectly coupled via one or more tubular member of intermediate CTE could alternatively be carried by a diaphragm or bellows, rather than a cantilever-type flexure, for example within the context of a pressure transducer where variable pressure acting on the diaphragm or bellows displaces this movable body toward and away from a stationary support to which the same one or more tubular members, or a separate set of one or more tubular members, are likewise bonded to indirectly couple the sensing optical fiber thereto. Also, in the cantilever flexure example, while two cantilever beams are preferred for optimal constraint of the proof mass movement to the axial direction of the fiber, a single-beam cantilever would likewise benefit from the unique CTE compensation techniques described herein.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. An optical fiber transducer comprising:
   a stationary support;
   a movable body supported in a manner displaceable back and forth relative to the stationary support in a predetermined direction;
   an optical fiber having a portion thereof operatively connected between the stationary support and the movable body in a position extending axially in said predetermined direction, said portion of the optical fiber having a first coupling region at which said portion is operably connected to the stationary support, a second coupling region at which said portion is operably connected to the movable body and an intermediate region disposed between said first and second coupling regions;

a Fiber Bragg Grating in the intermediate region of said portion of the optical fiber; and one or more tubular members disposed externally around said portion of the optical fiber, at least at the first and second coupling regions thereof, said one or more tubular members each comprising a material having a thermal expansion coefficient that is lesser than that of said stationary support and said movable body, and greater than that of the optical fiber;

wherein:

at the first coupling region, said portion of the optical fiber is bonded, by an internal adhesive of distinct material composition from the one or more tubular members, to a first internal surface area of said one or more tubular members, and a first external surface area of said one or more tubular members is bonded, by an external adhesive of distinct material composition from the one or more tubular members, to the stationary support; and at the second coupling region, said portion of the optical fiber is bonded, by more internal adhesive of distinct material composition from the one or more tubular members, to a second internal surface area of said one or more tubular members, and a second external surface area of said one or more tubular members is bonded, by more external adhesive of distinct material composition from the one or more tubular members, to the movable body.

2. The transducer of claim 1 wherein said first and second internal surfaces areas are defined on a same tubular member as one another.

3. The transducer of claim 2 wherein said portion of the optical fiber is also bonded to said same tubular member at least somewhere within the intermediate region between the first and second coupling regions.

4. The transducer of claim 3 wherein said portion of the optical fiber is bonded to said same tubular member over a full and continuous span of said intermediate region from the first coupling region to the second coupling region.

5. The transducer of claim 2 wherein said same tubular member also defines the first and second external surface areas of said one or more tubular members.

6. The transducer of claim 1 wherein said first and second external surfaces areas are defined on a same tubular member as one another.

7. The transducer of claim 1 wherein said one or more tubular members comprises a plurality of tubular members, of which a first tubular member defines the first internal surface area and a second tubular member defines the second internal surface area.

8. The transducer of 7 wherein said first tubular member defines the first external surface area and said second tubular member defines the second external surface area.

9. The transducer of claim 1 wherein at least one of said one or more tubular members comprises quartz.

10. The transducer of claim 1 wherein the stationary support and the movable body comprise high temperature materials.

11. The transducer of claim 1 wherein the stationary support and the movable body comprise a same high temperature material as one another.

12. The transducer of claim 1 wherein the stationary support and the movable body are seamlessly integral components of a singular unitary body comprised of a high temperature material.

13. The transducer of claim 1 wherein one or both of the support and the movable body comprise: a nickel alloy; a nickel-chromium superalloy; ceramic material; or metal oxide.

14. The transducer of claim 1 wherein at least one of either the internal adhesive and the external adhesive comprises a refractory cement.

15. The transducer of claim 1 wherein said movable body is connected to said stationary support by a cantilever flexure that has a proximal end attached to the stationary support and an opposing distal end attached to the movable body.

16. A method of producing an optical fiber transducer usable in environments of extreme operating temperature, components of said transducer including a stationary support, a movable body intended for back and forth displacement relative to the stationary support in a predetermined direction, and an optical fiber intended for connection to said stationary support and said movable body in a position spanning axially therebetween in said predetermined direction, and having a Fiber Bragg Grating in an intermediate region of said fiber, said method comprising configuring the transducer to accommodate varying coefficients of thermal expansion among said components by:

providing one or more tubular members each having a thermal expansion coefficient that is lesser than that of said stationary support and said movable body, and greater than that of the optical fiber;

at first and second coupling regions that reside oppositely of one another across the intermediate region of the fiber that contains the Fiber Bragg Grating, bonding said optical fiber to an interior of said one or more tubular members; and bonding an exterior of said one or more tubular members to said stationary support and said movable body.

17. The method of claim 16 wherein said one or more tubular members span continuously between the first and second coupling regions.

18. The method of claim 16 wherein said bonding of said optical fiber to said one or more tubular members is performed with said optical fiber in a relaxed unstrained state.

19. The method of claim 16 wherein said one or more tubular members comprises separate first and second tubular members for separate securement to the stationary support and movable body, the first and second coupling regions of the optical fiber are respectively bonded to said first and second tubular members, and the intermediate region of the optical fiber is left unsheathed between said first and second tubular members.

20. The method of claim 19 wherein said bonding of said optical fiber to said one or more tubular members comprises bonding said optical fiber to the first and second tubular members while said optical fiber is in a relaxed unstrained state, and said bonding of the one or more tubular members to the stationary support and the movable member comprises bonding the first tubular member to a first respective one of either the stationary support or the movable member, and bonding the second tubular member to a second respective one of either the stationary support or the movable member while said movable member is held in a displaced state moved from an equilibrium position in a direction away from the stationary support, thereby applying a tensile pre-strain to the optical fiber.

21. The method of claim 16 wherein said bonding of the one or more tubular members to the optical fiber, to the stationary support and to the movable body comprises adhesively bonding the one or more tubular members thereto using one or more adhesives that are of distinct material composition from said one or more tubular members.

\* \* \* \* \*